(12) United States Patent
Fierling

(10) Patent No.: US 6,371,655 B1
(45) Date of Patent: Apr. 16, 2002

(54) HOUSING DEVICE FOR A BALL-TYPE ROLLING BEARING AND ASSOCIATED ROLLING BEARING

(75) Inventor: Yannick Fierling, Petit-Rederching (FR)

(73) Assignee: SKF France, Clamart (FR)

(*) Notice: Subject to any disclaimer, the term of this patent is extended or adjusted under 35 U.S.C. 154(b) by 0 days.

(21) Appl. No.: 09/619,475

(22) Filed: Jul. 19, 2000

(30) Foreign Application Priority Data

Jul. 23, 1999 (FR) .............................. 99 09613

(51) Int. Cl.[7] .............................. F16C 33/49
(52) U.S. Cl. .................. 384/523; 384/470; 384/531
(58) Field of Search .............................. 384/523, 526, 384/531, 532, 533, 534, 470

(56) References Cited

U.S. PATENT DOCUMENTS

| | | | |
|---|---|---|---|
| 4,702,627 A | 10/1987 | Pollastro | 384/526 |
| 4,804,276 A | 2/1989 | Olschewski et al. | 384/526 |
| 5,015,105 A | * 5/1991 | Ueno | 384/531 |
| 5,035,520 A | * 7/1991 | Valette | 384/526 |
| 5,074,679 A | 12/1991 | McLarty | 384/526 |
| 5,387,041 A | 2/1995 | Lederman | 384/531 |
| 5,575,569 A | * 11/1996 | Shinohara | 384/470 |

FOREIGN PATENT DOCUMENTS

| | | |
|---|---|---|
| EP | 0 592 839 | 4/1994 |
| FR | 2 574 140 | 6/1986 |
| GB | 1 558 259 | 12/1979 |
| GB | 2 201 471 | 9/1988 |

* cited by examiner

*Primary Examiner*—Thomas R. Hannon
(74) *Attorney, Agent, or Firm*—Smith, Gambrell & Russell

(57) ABSTRACT

Annular housing device intended for maintaining the circumferential spacing of the rolling elements, in particular balls, in a rolling bearing, having at least one row of balls arranged between two rolling tracks, the housing having a rear face and a front face which are axially offset and having a multiplicity of substantially spherical cells, in each of which a ball is arranged, the cells issuing axially on the front face and radially on the two sides, the front face having a multiplicity of pairs of opposite tabs for maintaining the balls in the cells. The front face comprises two surfaces axially offset relative to one another, of which an outer first surface has the tabs projecting from it and is located in a plane in front of the radial plane passing through the centers of the cells, and of which an inner second surface is located in a plane passing substantially through the centers of the cells.

20 Claims, 4 Drawing Sheets

HOUSING DEVICE FOR A BALL-TYPE ROLLING BEARING AND ASSOCIATED ROLLING BEARING

The present invention relates to the field of housings used in rolling bearings for maintaining a uniform circumferential spacing between their rolling elements.

Housings have been used for many years which are made of synthetic material such as 6,6-polyamides, if appropriate reinforced with glass fibres in order to increase their mechanical characteristics, and which have many advantages including the ease with which they can be produced by injection moulding, the ease with which they can be installed by latching, their low level of operating noise and their lightness.

Such housings made of synthetic material are, of course, intended for uses where the rolling bearings can be induced to rotate at extremely high speeds. For example, for rolling bearings having small dimensions, with an outside diameter in the region of ten millimeters, these speeds may be of the order of one hundred thousand revolutions per minute.

The development of current techniques is tending to increase even further the rotational speeds to which the rolling bearings are subjected in continuous operation, so that problems arise which the housings known at the present time do not make it possible to solve.

More particularly, the housings used at the present time are generally in the form of a ring delimited radially by two substantially cylindrical surfaces concentric to their axis of rotation and axially by a front surface and a rear surface which are perpendicular to the axis of rotation of the housing.

This ring has spherical cells issuing radially on the outside and on the inside and axially in a direction through the said front surface. Each cell is prolonged by a pair of tabs arranged face to face and between them defining an orifice, through which a ball can be introduced axially into the cell by latching. The inner surfaces of the tabs of the cells encase the balls axially and radially in both directions, in order at the same time to ensure the retention of the housing on the row of balls and the spacing between the balls.

It was found that, at high rotational speeds, a conventional polyamide housing is subjected to pronounced deformation due to the centrifugal force, thus giving rise, in particular, to the following problems.

The cells undergo considerable deformations, thus bringing about an increase in the plays between the balls and the cells in the outer part of the latter and, on the contrary, a tendency for the cells to constrict on the inner parts of the balls.

The balls come in contact with the tabs mainly in their zones located towards the bore of the housing, thus giving rise to high friction and contact pressures between the housing and the balls.

This high friction and these high contact pressures increase the dissipation of energy, raise the temperature, destroy the lubricant film, increase wear and promote the detachment of microparticles from the. housing.

The situation may arise, furthermore, where the radial deformation of the housing causes contacts between this housing and the outer raceway of the rolling bearing.

It was also possible to note that, at high operating speeds, instability phenomena occur in the behaviour of the housing, along with in particular the appearance of vibratory phenomena, which are attributable to the fact that the centre of gravity of the housing is generally offset axially relative to the radial plane defined by the centres of the balls.

The phenomena which have just been mentioned lead, at very high speeds, to the rapid destruction of conventional cages and consequently of the rolling bearings.

The object of the present invention is to provide a housing device making it possible at least partially to overcome the disadvantages of conventional housings, in order to ensure improved operation of, in particular, ball-type rolling bearings equipped with such housings, and to increase their service life, especially when these rolling bearings are expected to operate at very high rotational speed.

The annular housing device according to the invention, intended for maintaining the circumferential spacing of the rolling elements, in particular balls, in a rolling bearing, comprises at least one row of balls arranged between two rolling tracks, the said housing having a rear face and a front face which are axially offset and having a multiplicity of substantially spherical cells, in each of which a ball is arranged, the said cells issuing axially on the said front face and radially on the two sides, the said front face having a multiplicity of pairs of opposite tabs for maintaining the said balls in the said cells.

According to the invention, the said front face comprises two surfaces axially offset relative to one another, of which a first surface has the said tabs projecting axially from it and is located in a plane in front of the radial plane passing through the centres of the said cells, and of which a second surface is located in a plane passing substantially through the centres of the said cells.

According to the invention, the said first surface is located radially outside the said second surface.

According to the invention, the said tabs are preferably arranged in such a way that contact between them and the balls is made in a zone located outside a virtual cylindrical surface of the same axis as the said housing and passing through the centres of the said cells.

According to the invention, the said tabs are preferably arranged in such a way that their free ends are located outside a virtual cylindrical surface of the same axis as the said housing and passing through the centres of the said cells.

According to the invention, the ratio between the radial thickness of the said tabs and the total radial thickness of the said housing is preferably between 0.45 and 0.6.

According to the invention, the ratio between the axial length of the said tabs and the thickness of the said housing from its rear face to the end of the said tabs is preferably between 0.07 and 0.33.

According to the invention, the original diameter passing through the centres of the said cells is preferably smaller than or equal to the original diameter of the rolling bearing passing through the centres of the balls.

According to the invention, the radial offset between the original diameter passing through the centres of the said cells and the original diameter of the rolling bearing passing through the centres of the balls is preferably between zero and one quarter of the diameter of the balls.

According to the invention, the said rear face of the housing preferably comprises at least one annular recess.

According to the invention, the bottoms of the cells are preferably provided with through-passages.

According to the invention, the said rear face of the housing preferably comprises an outer annular rib and an inner annular rib which are separated by an annular recess.

According to the invention, the bottom of the said recess preferably comprises convex parts in the zones of the cells and flat parts between these convex parts.

According to the invention, the said outer radial surface and the said inner radial surface meet preferably in a concave rounding.

According to the invention, the axial thickness of the said ribs is preferably reduced in the zone located between and at a distance from the said cells.

According to the invention, the ratio between the axial offset between the said outer and inner axial surfaces and the diameter of the balls is preferably between 0.05 and 0.33.

Another subject of the present invention is a ball-type rolling bearing comprising a housing device, such as has just been presented.

The present invention will be understood more clearly from a study of housing devices for ball-type rolling bearings, the said devices being described by way of non-limiting examples and being illustrated by the drawing which:

Figure 7:
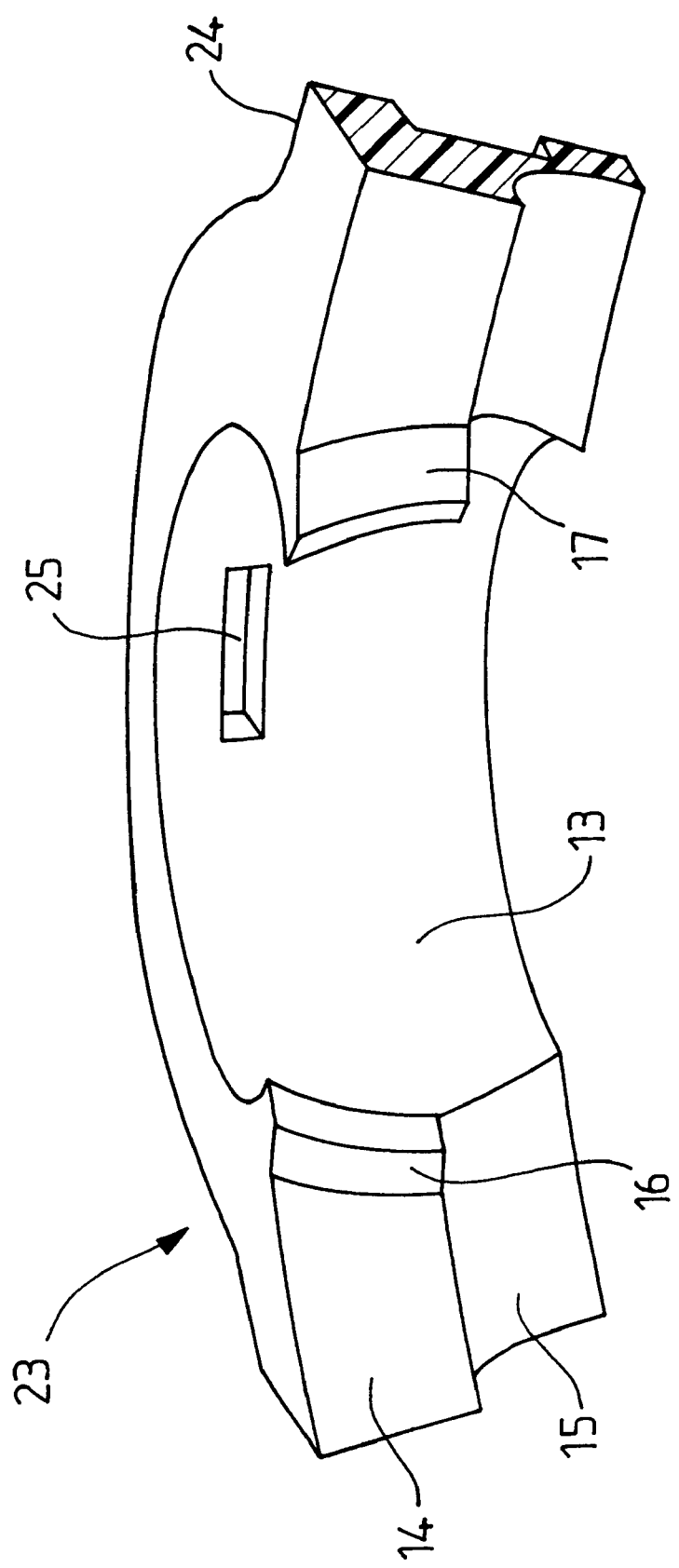

and FIG. 7 shows a perspective front view of a circumferential portion of an alternative embodiment of the above-mentioned housing.

Figure 1:
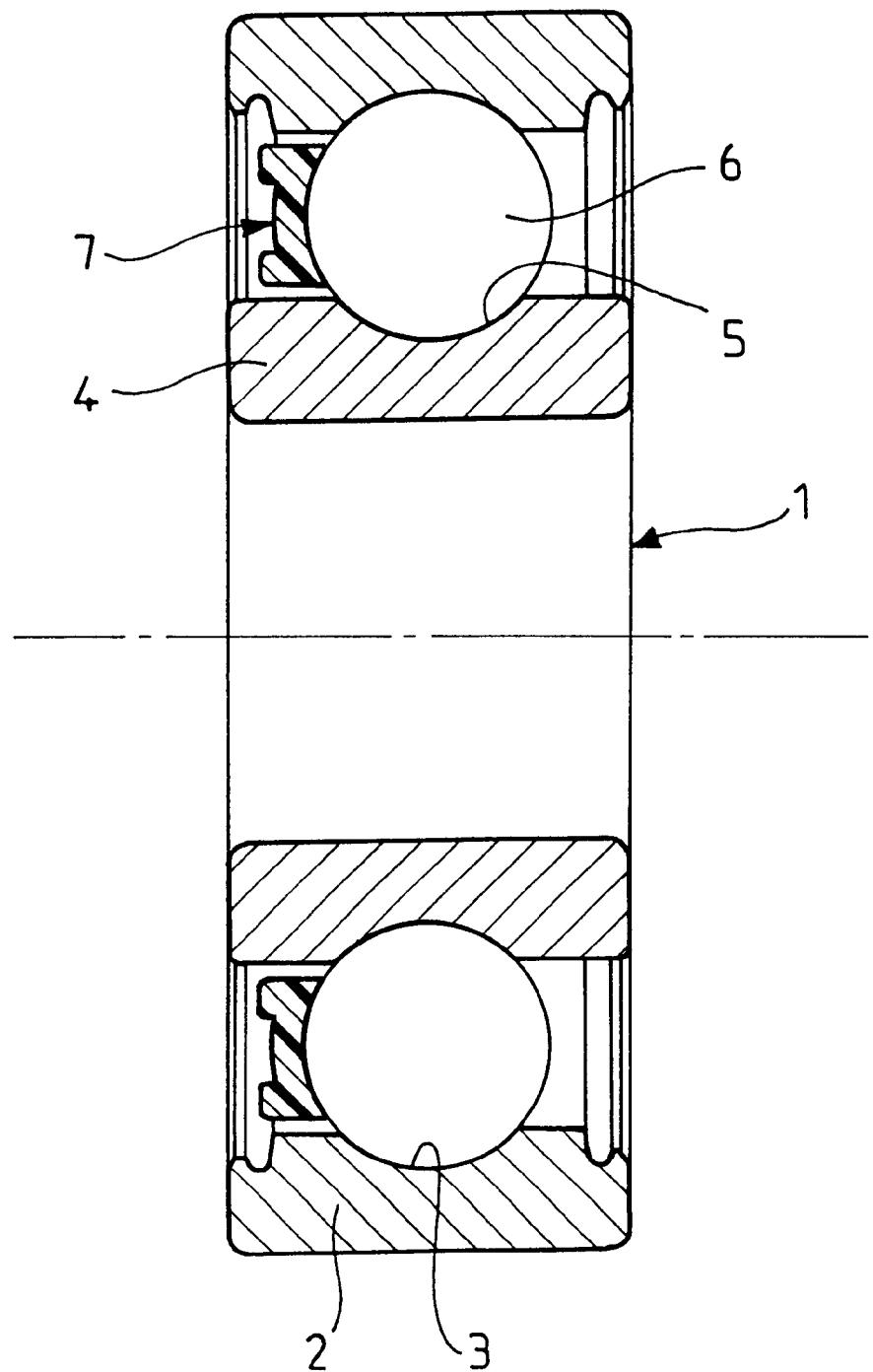
FIG. 1 shows, in longitudinal section, a ball-type rolling bearing equipped with a housing according to he invention.

Referring to FIG. 1, it will be seen that a ball-type rolling bearing 1 is shown, which comprises an outer raceway 2 provided in its bore with a toric rolling track 3, an inner raceway 4 provided in its outer surface with a toric rolling track 5, and a row of balls 6 arranged between the rolling track 3 of the outer raceway 2 and the rolling track 5 of the inner raceway 4.

The row of balls 6 is maintained by an annular housing 7 which is produced from a synthetic material and which makes it possible to maintain a uniform circumferential spacing between the balls 6.

Figure 2:
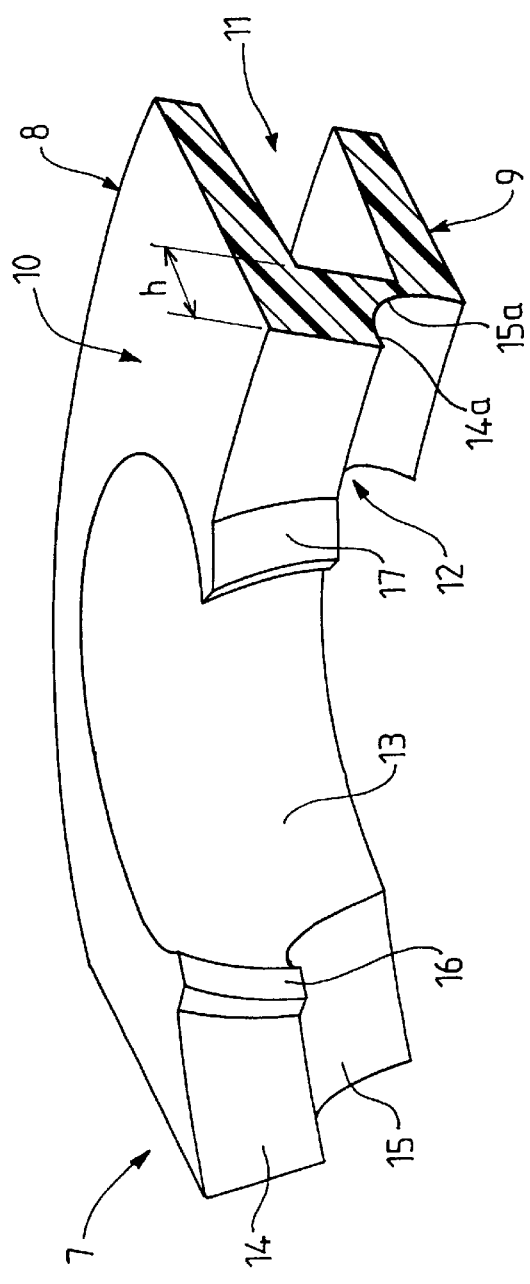
FIG. 2 shows a perspective front view of a circumferential portion of a housing according to the invention.
Figure 3:
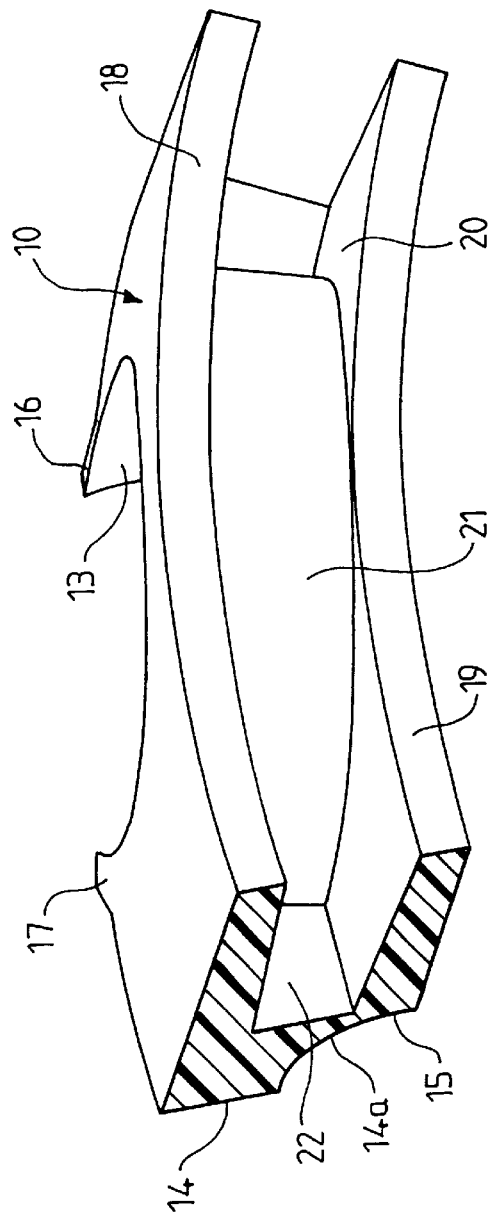
FIG. 3 shows a perspective rear view of a circumferential portion of the housing of FIG. 2.
Figure 4:
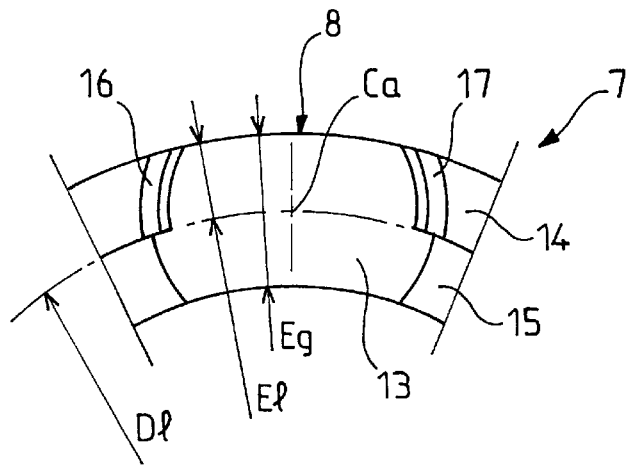
FIG. 4 shows a front view of a circumferential portion of the housing of FIG. 2.

Referring particularly to FIGS. 2 and 3, it will be seen that the housing 7 takes the form of a ring 8 which has a cylindrical inner face 9 located at a distance from the outer surface of the inner raceway of the rolling bearing 1, a cylindrical outer face 10 located at a distance from the inner surface of the outer raceway 2 of the rolling bearing 1, and also a rear face 11 and a fore or front face 12 which are axially spaced.

The ring 8 forming the housing 7 has a multiplicity of spherical cells 13 which are uniformly distributed in its circumferential direction and in each of which a ball 6 is arranged.

Each cell issues axially on the front face 12 and radially on the two sides on the inner face 9 and on the outer face 10.

The front face 12 of the ring 8 has an outer first radial surface 14 which is offset forwards relative to an inner second radial surface 15, the radial plane which contains this second surface 15 passing substantially through the centres Ca of the cells 13. Thus, the ring 8 has an annular shoulder projecting radially relative to the surface 15 and extending as far as the surface 14.

As will be seen in FIG. 2, the ratio between the axial offset h between the outer and inner axial surfaces 14, 15 and the diameter Db of the balls 6 is preferably between 0.05 and 0.33.

Starting from the advanced radial surface 14, the ring 8 has a multiplicity of pairs of opposite tabs 16 and 17 which are arranged respectively on either side of the cells 13 and which extend forwards, these tabs 16 and 17 having an outer flank prolonging the cylindrical outer face 10 and an inner flank prolonging the annular flank 14a at which the surface 14 and the surface 15 meet.

The outer surface 14 and the tabs 16 and 17 are located outside a virtual cylinder coaxial to the ring 8 and passing through the centres Ca of the cells 13.

That annular flank 14a of the outer surface 14 which is located on the inside meets the inner surface 15 in a concave rounding 15a.

Thus, the cells 13. have, at the rear of the radial plane passing through their centres Ca, a spherical surface extending over the radial thickness of the ring 8 and contained between the inner surface 9 and the outer surface 10 and have, in front of this plane, two opposite portions of spherical surfaces which are formed at the rear of the plane passing through the advanced surface 14 and which are prolonged as far as the ends of the tabs 16 and 17.

From one end of the tabs 16 and 17 to the end of the other tab, outside the said virtual cylinder, the cells 13 partially encase the upper part of the balls 6, in particular approximately three quarters of the said upper part, whilst, inside this virtual cylinder, in the zone of the inner radial surface 15, the cells 13 encase approximately half of the balls.

When the ring 8 forming the housing 7 is viewed on its rear face 11, it will be seen that the latter has an annular outer rib 18 and an annular inner rib 19 which are separated by an annular recess 20, the bottom of which has convex parts 21 in the zones of the cells 13, the said convex parts substantially matching the spherical shape of these cells, and, between these convex parts 21, surfaces 22 which extend in a radial plane slightly offset rearwards relative to the radial plane containing the inner radial surface 15 of the front face 12.

Figure 5:
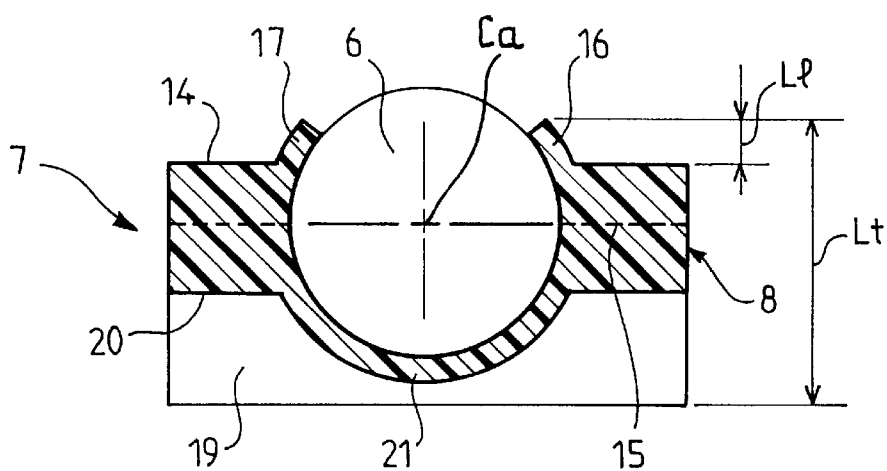
FIG. 5 shows a longitudinal section through a circumferential portion of the housing of FIG. 2.

Referring to FIG. 5, it will be seen that the ratio between the radial thickness El of the said tabs 16 and 17 and the total radial thickness Et of the annular housing 8 may be between 0.45 and 0.6.

Referring to FIG. 5, it will be seen that the ratio between the axial length Ll of the tabs 16 and 17 and the thickness Lt of the annular housing 8 from its rear face to the end of the said tabs, taken axially, may be between 0.07 and 0.33.

Figure 6:
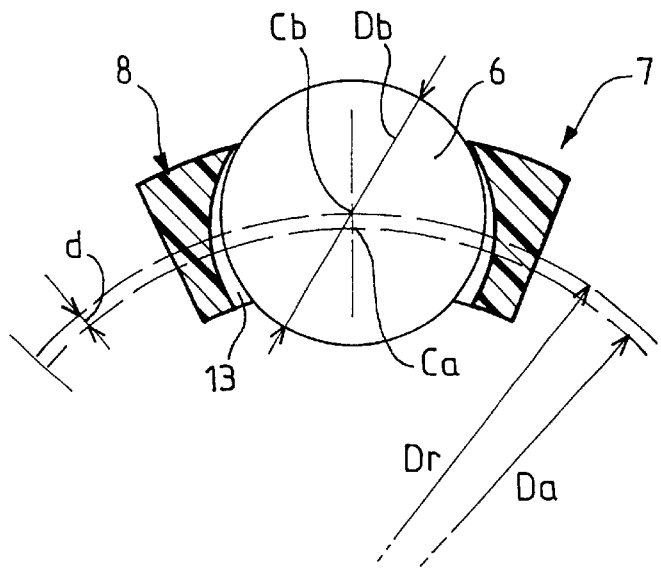
FIG. 6 shows a radial section through a circumferential portion of the housing of FIG. 2.

Referring to FIG. 6, it will be seen that the original diameter Da passing through the centres Ca of the cells 13 is smaller than or equal to the original diameter Dr of the rolling bearing passing through the centres Cb of the balls 6. In particular, the radial offset d between the original diameter Da passing through the centres Ca of the cells 13 and the original diameter Dr of the rolling bearing passing through the centres Cb of the balls 6 may be between zero and one quarter of the diameter Db of the balls 6.

The relative positions specified above may advantageously result in the balls 6 coming into contact with the walls of the cells 13 on zones located outside the virtual cylinder coaxial to the rolling bearing 1 and passing through the centres Ca of these cells 13.

In order to install the housing 7 on the rolling bearing 1, its front face 12 is presented opposite the annular space separating the raceways 2 and 4. Then, with the balls being prepositioned so as to be spaced, the housing 7 is pressed axially so as to cause the balls 6 to penetrate into the cells 13 by latching, at the same time reversibly deforming the tabs 16 and 17 which resume their positions in order to encase the balls 6.

Referring to FIG. 7, it will be seen that the housing 23 has been shown which is an alternative embodiment to the housing 7 and which differs from the latter in that its rear ribs 18 and 19 have clearances 24 in their zones located between and at a distance from the cells 13, thus reducing the axial thickness of the ribs 18 and 19, starting from the radial outer surface 14, and that in the bottoms of the cells 13 are formed through-passages 25 which allow a fluid for lubricating the rolling bearing 1 to circulate.

What is claimed is:

1. Annular housing device intended for maintaining the circumferential spacing of rolling elements in a rolling bearing, comprising at least one row of balls arranged between two rolling tracks, the said housing device having a rear face and a front face which are axially offset and having a multiplicity of substantially spherical cells, in each of which a ball is arranged, the said cells issuing axially on the said front face and radially on the two sides, the said front face having a multiplicity of pairs of opposite tabs for maintaining the said balls in the said cells, and the said front face comprising two surfaces axially offset relative to one another, of which a first surface has the said tabs projecting axially from it and is located in a plane in front of the radial plane passing through the centers of the said cells, and of which a second surface is located in a plane passing substantially through the centers of the said cells.

2. Housing device according to claim 1, wherein the said first surface is located radially outside the said second surface.

3. Housing device according to claim 1, wherein the said tabs are arranged in such a way that contact between them and the balls is made in a zone located outside a virtual cylindrical surface of the same axis as the said housing and passing through the centers of the said cells.

4. Housing device according to claim 1, wherein the said tabs ends are located outside a virtual cylindrical surface of the same axis as the said housing and passing through the centers of the said cells.

5. Housing device according to claim 1, wherein the ratio between the radial thickness (E1) of the said tabs and the total radial thickness (Et) of the said housing is between 0.45 and 0.6.

6. Housing device according to claim 1, wherein the ratio between the axial length (L1) of the said tabs and the length (Lt) of the said housing from its rear face to the end of the said tabs is between 0.07 and 0.33.

7. Housing device according to claim 1, wherein the original diameter (Da) passing through the centers of the said cells is smaller than or equal to the original diameter (Dr) of the rolling bearing passing though the centers of the balls.

8. Housing device according to claim 1, wherein the radial offset (d) between the original diameter (Da) passing through the centers of the said cells and the original diameter (Dr) of the rolling bearing passing through the centers of the balls is between zero and one quarter of the diameter of the balls.

9. Housing device according to claim 1, wherein the said rear face of the housing comprises at least one annular recess.

10. Housing device according to claim 1, wherein the bottoms of the cells are provided with through-passages.

11. Housing device according to claim 1, wherein the said rear face of the housing comprises an outer annular rib and an inner annular rib which are separated by an annular recess.

12. Housing device according to claim 11, wherein the bottom of the said recess comprises convex parts in the zones of the cells and flat parts between these convex parts.

13. Housing device according to claim 11, wherein the axial thickness of the said ribs is reduced in the zone located between and at a distance from the said cells.

14. Housing device according to claim 1, wherein the said outer radial surface and the said inner radial surface meet in a concave rounding.

15. Housing device according to claim 1, wherein the ratio between the axial offset (h) between the said outer and inner axial surfaces and the diameter of the balls is between 0.05 and 0.33.

16. Ball-type rolling bearing comprising at least one row of balls arranged between two rolling tracks and a housing device positioned for maintaining circumferential spacing of said at least one row of balls, said housing device having a rear face and a front face which are axially offset and having a multiplicity of substantially spherical cells, in each of which a ball is arranged, the said cells issuing axially on the said front face and radially on the two sides, the said front face having a multiplicity of pairs of opposite tabs for maintaining the said balls in the said cells, and said front face comprising two surfaces axially offset relative to one another, of which a first surface has the said tabs projecting axially from it and is located in a plane in front of the radial plane passing through the centers of the said cells and of which a second surface is located in a plane passing substantially through centers of the said cells.

17. The ball-type rolling bearing according to claim 16, wherein the said first surface is located radially outside the said second surface.

18. The ball-type rolling bearing according to claim 16, wherein the said tabs are arranged in such a way that contact between them and the balls is made in a zone located outside a virtual cylindrical surface of the same axis as the said housing and passing through the centers of the said cells.

19. The ball-type rolling bearing according to claim 16, wherein the said tabs ends are located outside a virtual cylindrical surface of the same axis as the said housing and passing through the centers of the said cells.

20. Housing device according to claim 16, wherein the bottoms of the cells are provided with through-passages.

* * * * *